3,468,857
THERMOSETTING POLYMERS OF UNSATURATED ACETALS
Richard B. Graver, Savage, Minn., assignor to Ashland Oil & Refining Company, Ashland, Ky., a corporation of Kentucky
No Drawing. Filed Oct. 4, 1965, Ser. No. 492,893
Int. Cl. C08f *19/00, 7/12*
U.S. Cl. 260—80.3    11 Claims

ABSTRACT OF THE DISCLOSURE

A thermosetting or thermoset polymer comprising the reaction product of an ethylenically unsaturated monomer and an unsaturated acetal selected from the group consisting of cyclic and noncyclic unsaturated acetals.

---

This invention relates to thermosetting polymers of unsaturated acetals. More particularly, this invention relates to thermosetting polymers of unsaturated acetals and ethylenically unsaturated monomers which find wide utility as protective coatings on various surfaces such as wood, plastics, metal, glass and the like.

A problem of long standing in the use of polymers of unsaturated acetals in coating applications has been the inability to successfully use these polymers and thermosetting compositions based thereon in both spray type of coating applications, wherein air-drying is a prerequisite; and also in filling applications on inclined surfaces wherein non-excessive drainage is a prerequisite. This excessive drainage, particularly from inclined or vertical surfaces, often referred to as crawling or cratering, is readily detected as it is manifested by a thinly coated area surrounded by a thicker coating. Generally, some drainage occurs at room temperature and continues until sufficient amounts of solvent or diluent, usually present in the composition, have evaporated thereby causing the viscosity of the coating or filling on the surface or in the interstices of the treated object to become sufficiently high to enable it to remain in position.

The present invention provides for polymers of unsaturated acetals and ethylenically unsaturated monomers, and to compositions based thereon, which can be successfully used in spray coating applications and also in filling and coating applications on inclined and vertical surfaces. The polymers of this invention have excellent light color characteristics, will cure to thermoset products when a cross-linking agent, e.g., epoxidized linseed oil is added and the mixture is contacted with a suitable catalyst, e.g., melamine plus an acid; yet the polymers are of sufficiently high viscosity to be free of undesirable drainage when applied as coatings and/or fillings on inclined surfaces. These polymers can be easily pigmented and further modified with fillers, solvents and other additives to compositions useful for applying decorative and protective finishes to articles manufactured from a variety of materials, such as wood, metal, plastics, glass and the like.

The unsaturated acetals which are reacted with ethylenically unsaturated monomers to produce the thermosetting polymers of this invention are compounds having the formulas noted below:

Formula I

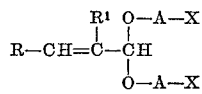

wherein: R can be hydrogen or alkyl, having 1 to 8 carbon atoms inclusive and preferably having 1 to 4 carbon atoms inclusive; $R^1$ can be hydrogen, methyl, or halogen, i.e., chlorine, bromine, iodine or fluorine; A is an alkylene radical, generally containing a maximum of 8 carbon atoms and preferably containing a maximum of 4 carbon atoms; and each X, which can be the same or different, is a functional group which does not react under the conditions of the polymerization reaction with the ethylenically unsaturated monomer, as for example, hydrogen, hydroxyl and halogen, as previously described.

Formula II

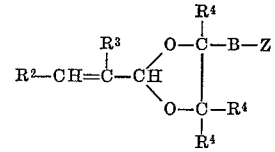

wherein: $R^2$ is as defined for R; $R^3$ is as defined for $R^1$; $R^4$ is as defined for R; B is as defined for A and Z is as defined for X.

Formula III

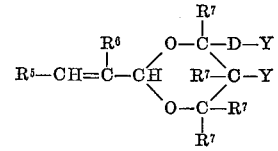

wherein: $R^5$ is as defined for R; $R^6$ is as defined for $R^1$; $R^7$ is as defined for R; D is as defined for A; and Y is as defined for X.

Among suitable acetals falling within the scope of Formulas I–III are the following:

Formula I.—1,1-dimethoxy-2-propene; 1,1-diethoxy-2-propene; 1,1-dibutoxy-2-propene; 1-methoxy-1-ethoxy-2-propene; 1,1-dimethoxy-2-methyl-2-propene; 1-methoxy-1-ethoxy-2-methyl-2 - propene; 1,1-di(2-methoxyethyl)-2-propene; 1,1-di(2-acetylethyl)-2 - propene; 1,1-di(2-hydroxyethyl)-2-propene and the like.

Formula II.—2-vinyl-1,3-dioxolane; 2-vinyl-4,5-dimethyl-1,3-dioxolane; 2-vinyl-4-hydroxymethyl-1,3-dioxolane; 2-vinyl-4-chloromethyl - 1,3-dioxolane; 2-vinyl-4-(4-hydroxybutyl)-1,3-dioxolane; 2-propenyl-1,3-dioxolane; 2-propenyl-4-hydroxymethyl - 1,3-dioxolane; 2-propenyl-4-(4-hydroxybutyl)-1,3-dioxolane and the like.

Formula III.—2-vinyl-1,3-dioxane; 2-vinyl - 4,5,5-trimethyl-1,3-dioxane; 2-vinyl-4,6,6-trimethyl-1,3-dioxane; 2-vinyl-5-hydroxy-1,3-dioxane; 2-propenyl-1,3-dioxane; 2-propenyl-4,4,6-trimethyl-1,3 - dioxane; 2-propenyl-5-hydroxy-1,3-dioxane and the like.

Unsaturated acetals are known compounds and can be produced according to the procedures described in a book by C. W. Smith entitled "Acrolein," published by John Wiley and Sons.

Ethylenically unsaturated compounds which can be copolymerized with the unsaturated acetals to produce the thermosetting polymers of this invention include, among others, vinylidene halides, such as vinylidene chloride, vinylidene bromide and the like; vinyl esters, such as vinyl acetate, vinyl propionate, vinyl butyrate, vinyl chloracetate, vinyl chloropropionate, vinyl stearate, vinyl chlorobenzoate; acrylic and alpha-alkyl acrylic acids, their alkyl esters, their amides and their nitriles, such as acrylic acid, chloroacrylic acid, methacrylic acid, ethacrylic acid, methyl acrylate, ethyl acrylate, butyl acrylate, octyl acrylate, 2-ethylhexyl acrylate, decyl acrylate, methyl methacrylate, ethyl ethacrylate, acrylamide, N-methyl acrylamide, N,N-di-methyl acrylamide, methacrylamide, N-methyl methacrylamide, N,N-dimethyl methacrylamide, acrylonitrile, chloroacrylonitrile, methacrylonitrile, ethacrylonitrile and the like; vinyl aromatic compounds such as styrene, dichlorostyrene, vinyl naphthalene and the like; alkyl esters of maleic, itaconic and fumaric acids, such as dimethyl maleate, dibutyl maleate and the like; vinyl alkyl ethers and vinyl alkyl ketones, such as vinyl methyl ether, vinyl ethyl ether, methyl vinyl ketone, ethyl vinyl ketone, isobutyl vinyl ketone, hydroxyl-terminated monomers, such as hydroxy ethyl acrylate, hydroxy propyl acrylate, hydroxy ethyl methacrylate, hydroxy propyl methacrylate, allyl alcohol, trimethylol propane monoalkyl ether, and the like; amine- terminated monomers, such as t-butylamino ethyl methacrylate, diethyl amino ethyl methacrylate, dimethyl amino ethyl methacrylate, and the like. Other suitable mono-ethylenically unsaturated monomers are vinyl pyridine, N-vinyl carbazole, N-vinyl pyrrolidone, ethyl methylene malonate, isobutylene, ethylene, trichloroethylene and the like.

It is to be understood that one or more unsaturated acetals and/or ethylenically unsaturated compounds can be polymerized.

In polymerizing an unsaturated acetal, as described, with an ethylenically unsaturated compound, it is customary to formulate a composition comprising the unsaturated acetal, the ethylenically unsaturated compound and a peroxide or azo type catalyst.

Any organic peroxide catalyst which is stable at room temperature and will preferably decompose at a temperature below about 150° C. can be used as a catalyst for promoting the polymerization reaction. Illustrative of suitable peroxides are the polymer hydroperoxides, such as polyethylene hydroperoxide, polypropylene hydroperoxide and other such polymer hydroperoxides, as for example, are disclosed in U.S. Patent 2,911,398, issued Nov. 3, 1959, to Edwin J. Vandenberg; the perester peroxides, such as t-butyl peracetate, t-butyl peroxyisobutyrate, di-t-butyl diperphthalate, t-butyl perbenzoate, di-t-butyl dipermethyl malonate, di-t-amyl dipermethyl malonate, di-t-hexyl diperethyl succinate, di-t-hexyl diperglutarate, di-t-amyl dipersuccinate and the like, for instance, as are disclosed in U.S. Patent 2,763,635, issued Sept. 18, 1956, to Charles M. Lucher et al., and as are disclosed in U.S. Patent 2,698,863, issued Jan. 4, 1955, to Frank H. Dickey; diacyl aromatic peroxides, exemplary of which are the peroxides having the formula:

$$(R'CO)_2O_2$$

wherein: $R'$ is an aryl radical, such as benzoyl peroxide, 2,4-dichlorobenzoyl peroxide, p-chlorobenzoyl peroxide and the like; diacryl aliphatic peroxides, such as those having the formula:

$$(R^2CO)_2O_2$$

wherein: $R^2$ is an alkyl group, as for example, acetyl peroxide, caprylyl peroxide, myristoyl peroxide, lauroyl peroxide and the like; dibasic acid peroxides, such as succinic acid peroxide, the ketone peroxides, such as methyl-ethyl ketone peroxide, cyclohexanone peroxide and the like; the aldehyde peroxides, such as hydroheptyl peroxide and the like; peroxides having the formula:

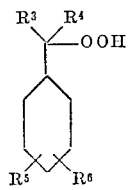

wherein: $R^3$ and $R^4$ are alkyl groups, $R^5$ is dialkyl methyl or trialkyl methyl; with the alkyl group in each case containing a maximum of 8 carbon atoms and $R^6$ is hydrogen or an alkyl group containing a maximum of 8 carbon atoms such as 1,1-dimethyl-1-(isopropyl cyclohexyl)methyl hydroperoxide, 1,1-dimethyl-1-(diisopropyl cyclohexyl)methyl hydroperoxide and the like as are further disclosed in U.S. Patent 2,776,954 to Milton A. Taves; di(aralkyl) peroxides of the formula:

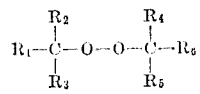

wherein $R_1$ is aryl, $R_2$, $R_3$, $R_4$ and $R_5$ are hydrogen or alkyl groups of less than 4 carbon atoms and $R_6$ is aryl such as dibenzyl peroxide, bis(α-methylbenzyl)peroxide, bis(α-ethylbenzyl)peroxide, bis(α-propylbenzyl)peroxide, benzyl(α - methylbenzyl)peroxide, benzyl(α - methyl-p-methylbenzyl)peroxide, benzyl(α - methyl - p - isopropylbenzyl)peroxide and the like as are further disclosed in U.S. Patent 2,826,570, issued Mar. 11, 1958, to Reginald W. Ivett; hydroperoxides, such as 2,5-dimethylhexane-2,5-dihydroperoxide, p-menthane hydroperoxide, t-butyl-hydroperoxide, benzoin peroxide and the like; di-tertiary alkyl peroxides such as di-t-butyl peroxide.

Among suitable azo compounds can be mentioned the following: azo bisdiisobutyronitrile, 2-(2-hydroxyethyl azo)-2,4-dimethylvaleronitrile and the like as are further disclosed in U.S. Patent 2,471,959, issued May 31, 1949, to Madison Hunt.

As a rule about 1 to about 4 percent by weight, based on the weight of the reactants, of peroxide is employed.

In conducting the polymerization reaction between the unsaturated acetal and the ethylenically unsaturated compound it is customary to utilize from about 0.01 mole to about 0.20 mole of acetal per mole to the ethylenically unsaturated compound which is copolymerizable therewith. For optimum results from about 0.03 mole to about 0.12 mole of acetal per mole of ethylenically unsaturated compound is used.

Also, in carrying out the polymerization reaction, it is preferable to conduct the reaction in the presence of an inert organic solvent, which is a solvent for the reactants, catalysts and the result polymer.

Illustrative of suitable solvents can be noted the aromatic hydrocarbons such as benzene, chlorobenzene, toluene, xylene and the like; cycloaliphatics such as cyclopentane, cyclohexane, isopropyl cyclohexane and the like; alcohols, Cellosolves and Carbitols, such as butanol, methyl Cellosolve and methyl Carbitol; ketones such as cyclohexanone and methyl-isobutyl ketone; and esters such as butyl acetate and Cellosolve acetate. Preferably, the solvent system contains 10 to 50 percent of an oxygenated solvent.

The amount of solvent used can vary over a wide range from about 20 percent by weight to about 80 percent by weight of the total weight of the reaction mixture.

The use of a solvent is not only desirable in that it brings the reactants into intimate contact but, in addition, the ultimate polymer solution can be used directly to apply the polymer onto a desired surface. The actual solvent used will depend, in part, upon the materials of the reaction mixture as well as the temperature at which the polymerization reaction is carried out.

The temperature at which the polymerization reaction is carried out can vary over a wide range from about room temperature to about 300° F., generally from about 100° F. to about 300° F. and preferably from about 160° F. to about 260° F. In part, the temperature depends on the polymerization catalyst.

The polymerization reaction can be conducted under atmospheric, sub-atmospheric or super-atmospheric pressure and preferably conducted under an inert atmosphere.

Generally, the time required for substantial complete conversion of monomer to polymer is about 2 to about 20 hours.

Also, if desired, the polymerization can be controlled so that the molecular weight of the ultimate polymer can be varied by utilizing chain transfer agents or chain terminators. These are added to the reaction mixture generally in amounts of about 0.01 to about 1.0 percent by weight and preferably about 0.05 to about 0.5 percent by weight of the total reactants. Among suitable chain transfer agents are carbon tetrachloride and the like. Among suitable chain terminators are the thiols such as α-toluenethiol, 1-dodecanethiol and the like.

As previously stated, the thermosetting polymers of this invention can be applied as coatings directly from the reaction mixture, whenever organic solvents are used in conducting the reaction. As a rule, the solids content of the solution is adjusted to about 40 percent by weight to about 60 percent by weight based on the solids content. The solution is then applied by any desired coating technique, as for example, spraying, electrostatic spraying, dipping, brushing, roller coating and the like.

Although the thermosetting polymers of this invention will thermoset to hard, glossy finishes at room temperature, when a suitable cross-linking agent and a catalyst are added, it is customary to heat them to temperatures on the order of about 100° C. to about 180° C.

The polymers of this invention can be used alone or in conjunction with other resinous materials. They are compatible with epoxy resins, epoxidized oils, urea-formaldehyde resins, melamine-formaldehyde resins, alkyd resins and the like. When blended with one or more of these other resins and baked at temperatures above 250° F. for periods of 30 minutes or longer, hard, glossy, highly resistant coatings are obtained. Under the baking conditions outlined above, a curing process takes place between the functional groups of the polymer and the functional groups of the modifying resins. Milder curing conditions can generally be used if these reactions are catalyzed; basic materials are particularly effective catalysts for the epoxy blends, and acidic materials can be used to cure the urea and melamine blends. Useful catalyst concentrations range from 0.05 to 5.0 weight percent based on the solids weight of the blend.

The following examples further illustrate the present invention and are not intended to limit the scope thereof in any manner.

EXAMPLE 1

The following materials were introduced into a batch reactor which was equipped with a stirrer, condenser and thermometer.

| | Parts by weight |
|---|---|
| 2-vinyl-4-(4-hydroxybutyl)-1,3-dioxolane | 24 |
| Xylene | 60 |
| n-Butanol | 20 |
| Methyl Cellosolve (ethyleneglycol monomethylether) | 20 |

The contents in the reactor were heated to a temperature of 245° F. and the following charge added thereto:

| | Parts by weight |
|---|---|
| Methyl methacrylate | 171 |
| Butyl methacrylate | 87 |
| Methacrylic acid | 9 |
| Cumene hydroperoxide | 6.6 |
| Di-tertiary butyl peroxide | 1.8 |

The charge noted immediately above was premixed in a separate vessel and added to the reactor at a constant rate over a 2½ hour period. A reaction temperature of 245° F. to 255° F. was maintained throughout the remainder of the reaction period. Three hours after the addition of the above-identified charge 0.5 part by weight cumene hydroperoxide was added to the contents in the reactor. After the cumene hydroperoxide addition, the reaction mixture was allowed to stand for nine hours at the temperature indicated above. The completeness of the reaction was then determined by the precent non-volatile material in the reaction mixture. The reaction was considered as completed when the theoretical percent (by weight) non-volatile material, as calculated from the initial charge was attained; in this example 50 percent by weight non-volatile material indicated complete conversion.

The polymer recovered had a viscosity of 55.4 stokes at 25° C. and a Gardner color of less than one.

EXAMPLE 2

The following materials were introduced into a batch reactor which was equipped with a stirrer, condenser and thermometer.

| | Parts by weight |
|---|---|
| 1,1-dimethoxy-2-propene | 24 |
| Xylene | 180 |
| n-Butanol | 60 |
| Methyl Cellosolve | 60 |

The contents in the reactor were heated to a temperature of 190° F. and the following charge added thereto.

| | Parts by weight |
|---|---|
| Methyl methacrylate | 177 |
| Butyl methacrylate | 87 |
| Methacrylic acid | 9 |
| Azobisdiisobutyronitrile | 3 |

The charge noted immediately above was premixed in a separate vessel and added to the reactor at a constant rate over a 2½ hour period. The reaction mixture was maintained at a temperautre of 190° F. and 8 hours after the addition of the above-identified charge, 0.5 part by weight of azobisdiisobutyronitrile was added to the contents in the reactor. After this addition, the reaction mixture was allowed to stand for four hours at a temperature of 190° F. At the end of this time, the reaction was essentially complete as indicated by a non-volatile content of 59 percent by weight. The non-volatile content of the reaction mixture was then adjusted to 55 percent by weight by the addition thereto of 37 parts by weight xylene. This product had a viscosity of 86 stokes at 25° C. and a Gardner color of 2.5.

EXAMPLE 3

The following materials were introduced into a batch reactor which was equipped with a stirrer, condenser and thermometer.

| | Parts by weight |
|---|---|
| Dibutyl itaconate | 60 |
| Xylene | 150 |
| n-Butanol | 50 |

The contents in the reactor were heated to a temperature of 250° F. and the following charge added thereto.

| | Parts by weight |
|---|---|
| Methyl methacrylate | 142.8 |
| Styrene | 45 |
| Methacrylic acid | 9 |
| Hexanetriol acrolein acetal | 33.9 |
| Cumene hydroperoxide | 6.6 |
| Di-tertiary butyl peroxide | 1.8 |
| Benzyl mercaptan | 0.9 |

The charge noted immediately above was premixed in a separate vessel and added to the reactor at a constant rate over a 2½ hour period. The reaction mixture was held at reflux throughout the remainder of the reaction period. Thirteen hours after the addition of the above-identified charge, 0.5 part by weight cumene hydroperoxide was added to the reaction mixture. After another 3½ hours at reflux, a product was obtained having a non-volatile content of 59.8 percent by weight, a viscosity of 32.4 stokes at 25° C. and a Gardner color of 4.

EXAMPLE 4

The following materials were introduced into a batch reactor which was equipped with a stirrer, condenser and thermometer.

| | Parts by weight |
|---|---|
| Glycerol acrolein acetal | 24 |
| Xylene | 180 |
| n-Butanol | 60 |
| Methyl Cellosolve | 60 |

The contents in the reactor were heated to a temperature of 245° F. and the charge described in Example 1 added thereto in a manner described in Example 1.

The polymer was then produced in a manner described in Example 1.

The product had a viscosity of 92.7 stokes at 25° C., a Gardner color of less than one and a non-volatile content of 50 percent by weight.

EXAMPLE 5

The following materials were introduced into a batch reactor which was equipped with a stirrer, condenser and thermometer.

| | Parts by weight |
|---|---|
| 2-vinyl-4,4,6-trimethyl-1,3-dioxane | 24 |
| Xylene | ¹ 80 |
| n-Butanol | 60 |
| Methyl Cellosolve | 60 |

The contents in the reactor were heated to a temperature of 245° F. and the charge described in Example 1 added thereto in a manner described in Example 1.

The polymer was then produced in a manner as described in Example 1.

The product had a viscosity of 92.7 stokes at 25° C., a Gardner color of less than one and a non-volatile content of 50 percent by weight.

The examples which follow illustrate the use of the products exemplified by Examples 1–5.

EXAMPLE 6

The product of Example 1 was blended, at room temperature, with a melamine-formaldehyde resin (15% by weight solids based on the total resin solids). The mixture was cast onto glass plates and tin plated steel to a film thickness of 3 mils. Each film was baked for thirty minutes at a temperature of 250° F. Each film was clear, hard and had good resistance to xylene.

EXAMPLE 7

The product of Example 1 was blended at room temperature with epoxidized linseed oil (17 percent by weight solids content based on the total resin solids). A film was cast from this mixture in a manner as described in Example 1 and used in a manner also as described in Example 1. This film was clear and more flexible than the film of Example 6.

EXAMPLE 8

The product of Example 1 was blended with the resin of Example 6 and pigmented with titanium dioxide using a pigment to resin weight ratio (based on the non-volatile resin content of the mixture) of 0.88 to 1. A film of this enamel was drawn down on a glass panel to dry film thickness of 1.5 mils. After baking 17 minutes at 265° F., the film had excellent color characteristics, a 60° gloss reading of 77 and a 20 degree gloss reading of 36.

EXAMPLE 9

The product of Example 2 was blended with the resin of Example 6 and pigmented with titanium dioxide using a pigment to resin weight ratio (based on the non-volatile resin content of the mixture) of 0.88 to 1. A film of this enamel was drawn down on a glass panel to a dry film thickness of 1.5 mils. After baking 17 minutes at 265° F., the film had excellent color characteristics, a 60 degree gloss reading of 88 and a 20 degree gloss reading of 67. (Gloss reading is obtained from a test, standard in the coatings industry, wherein percent reflectance is measured with a photocell that has first been standardized against a primary standard.)

What is claimed is:

1. A polymer which is a reaction product of (1) an ethylenically unsaturated monomer selected from the group consisting of vinylidene halides, vinyl esters, acrylic and alpha-alkyl acrylic acids and esters, amides and nitriles thereof, vinyl aromatics, alkyl esters of maleic, itaconic and fumaric acids, vinyl alkyl ethers, vinyl alkyl ketones, hydroxy-terminated and amine-terminated lower alkyl acrylates, allyl alcohol, trimethylol propane mono-alkyl ethers, vinyl pyridine, N-vinyl carbazole, N-vinyl pyrolidone, ethyl methylene malonate, isobutylene, ethylene, and trichloroethylene and (2) an unsaturated acetal selected from the group consisting of compounds having the formula:

(a) 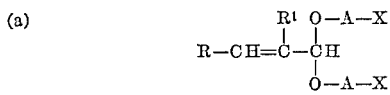

wherein R is selected from the group consisting of hydrogen and alkyl, $R^1$ is selected from the group consisting of hydrogen, methyl and halogen, A is alkylene containing from 1–8 carbon atoms and X is selected from the group consisting of hydrogen, hydroxyl and halogen;

(b) 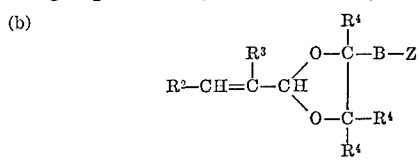

wherein $R^2$ and $R^4$ are as defined for R, $R^3$ is as defined for $R^1$, B is as defined for A, and Z is as defined for X; and (c) 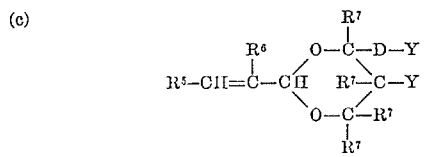

wherein $R^5$ and $R^7$ are as defined for R, $R^6$ is as defined for $R^1$, D as defined for A, and Y is as defined for X; reacted in the presence of an organic peroxide or azo nitrile catalyst.

2. A polymer according to claim 1 wherein the unsaturated acetal has the formula:

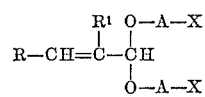

wherein R is selected from the group consisting of hydrogen and alkyl, $R^1$ is selected from the group consisting of hydrogen, methyl and halogen, A is alkylene containing from 1 to 8 carbon atoms and X is selected from the group consisting of hydrogen, hydroxyl and halogen.

3. A polymer according to claim 1 wherein the unsaturated acetal has the formula:

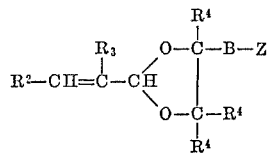

wherein $R^2$ is selected from the group consisting of hydrogen and alkyl, $R^3$ is selected from the group consisting of hydrogen, methyl and halogen, $R^4$ is as defined for $R^2$, B is alkylene containing from 1 to 8 carbon atoms and Z is selected from the group consisting of hydrogen, hydroxyl and halogen.

4. A polymer according to claim 1 wherein the unsaturated acetal has the formula:

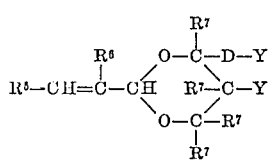

wherein $R^5$ and $R^7$ are selected from the group consisting of hydrogen and methyl, $R^6$ is selected from the group consisting of hydrogen, alkyl and halogen, D is alkylene containing from 1 to 8 carbon atoms and Y is selected from the group consisting of hydrogen, hydroxyl and halogen.

5. A polymer as defined in claim 1 wherein the unsaturated acetal is 2-vinyl-4-(4-hydroxybutyl)-1,3-dioxolane.

6. A polymer as defined in claim 1 wherein the unsaturated acetal is 1,1-dimethoxy-2-propene.

7. A polymer as defined in claim 1 wherein the unsaturated acetal is glycerol acrolein acetal.

8. A polymer as defined in claim 1 wherein the unsaturated acetal is 2-vinyl-4,4,6-trimethyl-1,3-dioxane.

9. A polymer as defined in claim 1 wherein the ethylenically unsaturated monomer is methyl methacrylate.

10. A polymer as defined in claim 1 wherein the ethylenically unsaturated monomer is butyl methacrylate.

11. A polymer as defined in claim 1 wherein the ethylenically unsaturated monomer is methacrylic acid.

References Cited

UNITED STATES PATENTS

| | | | |
|---|---|---|---|
| 2,578,861 | 12/1951 | Thomas et al. | 260—80.3 XR |
| 3,008,919 | 11/1961 | Guest et al. | 260—73 XR |
| 3,010,918 | 11/1961 | Ikeda. | |

WILLIAM H. SHORT, Primary Examiner

L. M. PHYNES, Assistant Examiner

U.S. Cl. X.R.

260—23, 63, 78.5, 85.5, 85.7, 86.1, 87.5, 87.7, 88.1, 88.3, 91.1, 851